Oct. 27, 1953

B. W. CHAPIN 2,656,699

COMBINED WASHER AND EXTRACTOR WITH
RESILIENT DRIVE CONNECTION

Filed Oct. 16, 1948

INVENTOR
BRYAN W. CHAPIN

BY *J. P. Kemper*

ATTORNEY,

Oct. 27, 1953 — B. W. CHAPIN — 2,656,699
COMBINED WASHER AND EXTRACTOR WITH RESILIENT DRIVE CONNECTION
Filed Oct. 16, 1948 — 2 Sheets-Sheet 2
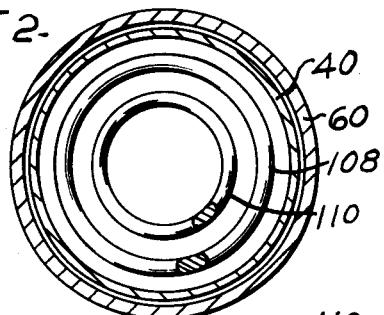
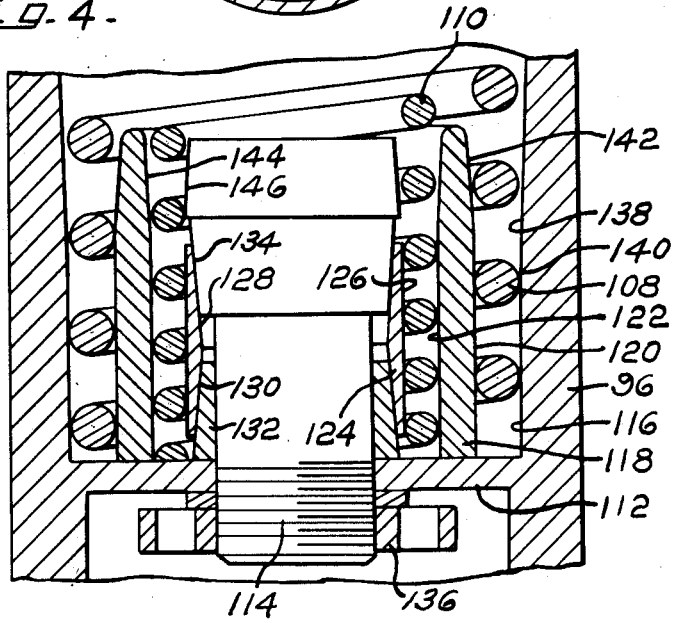
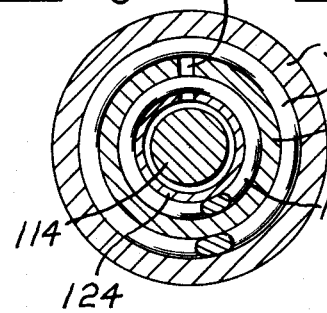
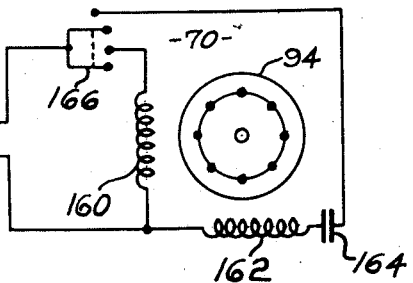
INVENTOR
BRYAN W. CHAPIN
BY
ATTORNEY Patented Oct. 27, 1953

2,656,699

UNITED STATES PATENT OFFICE 2,656,699

COMBINED WASHER AND EXTRACTOR WITH RESILIENT DRIVE CONNECTION

Bryan W. Chapin, Tully, N. Y., assignor to Easy Washing Machine Corporation, Syracuse, N. Y., a corporation of Delaware Application October 16, 1948, Serial No. 54,971

16 Claims. (Cl. 68—23)

This invention relates to oscillatory drives, and more particularly to one having application to washing machines and other apparatus utilizing similar oscillatory or to and fro motion.

In washing machines, turbulence of the washing fluid is generally derived either by tumbling or tumbling alternately in opposite directions or by reciprocating or oscillatory agitators. To obtain such oscillatory or frequent reversal of movement, resort has been had to various forms of gearing including more frequently cranks or eccentrics and connecting rods acting through various gears, such gearing being expensive, bulky and subject to wear. The present invention seeks to overcome the necessity for such mechanism through the use of a reversible motor adapted to directly provide the reversing motion, resort being had to spring coupling means in the combination.

It has been previously determined as described in copending applications Serial No. 793,159, filed December 22, 1947, and Serial No. 36,835, filed July 3, 1948, now Patent No. 2,588,963, that a reversible motor, resiliently coupled to an oscillatable driven member, may be employed to act as a prime source of oscillatory motion. The motor rotor, and driven member, may be otherwise free of any anchor, resilient or otherwise, and the system acts as a pair of inertia elements coupled resiliently, and oscillating in opposition with respect to one another, with the resilient coupling exhibiting a nodal point. To this system, power is applied to the motor element to cause it to continue its rotation to a stall in either direction, once rotation is initiated. The opposed ends of the system on either side of the nodal point act substantially as resiliently hung masses in effect anchored at the nodal point.

It is accordingly an object of the present invention to provide a simple oscillatory power drive.

Another object of the invention is to provide a power drive of the type described in which the drive may be readily converted from an oscillatory drive to a continuous rotational drive.

A further object of the invention is to provide a convertible drive as described, in which the angular velocity of the oscillatory drive is relatively low while that of the continuous rotation is relatively high.

Still another object of the invention is the provision of an oscillatory drive in which all parts are rigidly secured to one another and in which there are no relatively moving parts except for yielding of the resilient element forming a part thereof.

A still further object of the invention is to provide a coil spring coupling capable of rigidly gripping an end and at the same time control the stress in the initial free turns.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 2 is an enlarged section taken on the line 2—2 of Figure 1;

Figure 3 is an enlarged fragmentary view of the spring coupling shown in Figure 1;

Figure 4 is an enlarged section taken on the line 4—4 of Figure 1; and

Figure 5 is a circuit diagram for use in conjunction with the apparatus.

Figure 1:
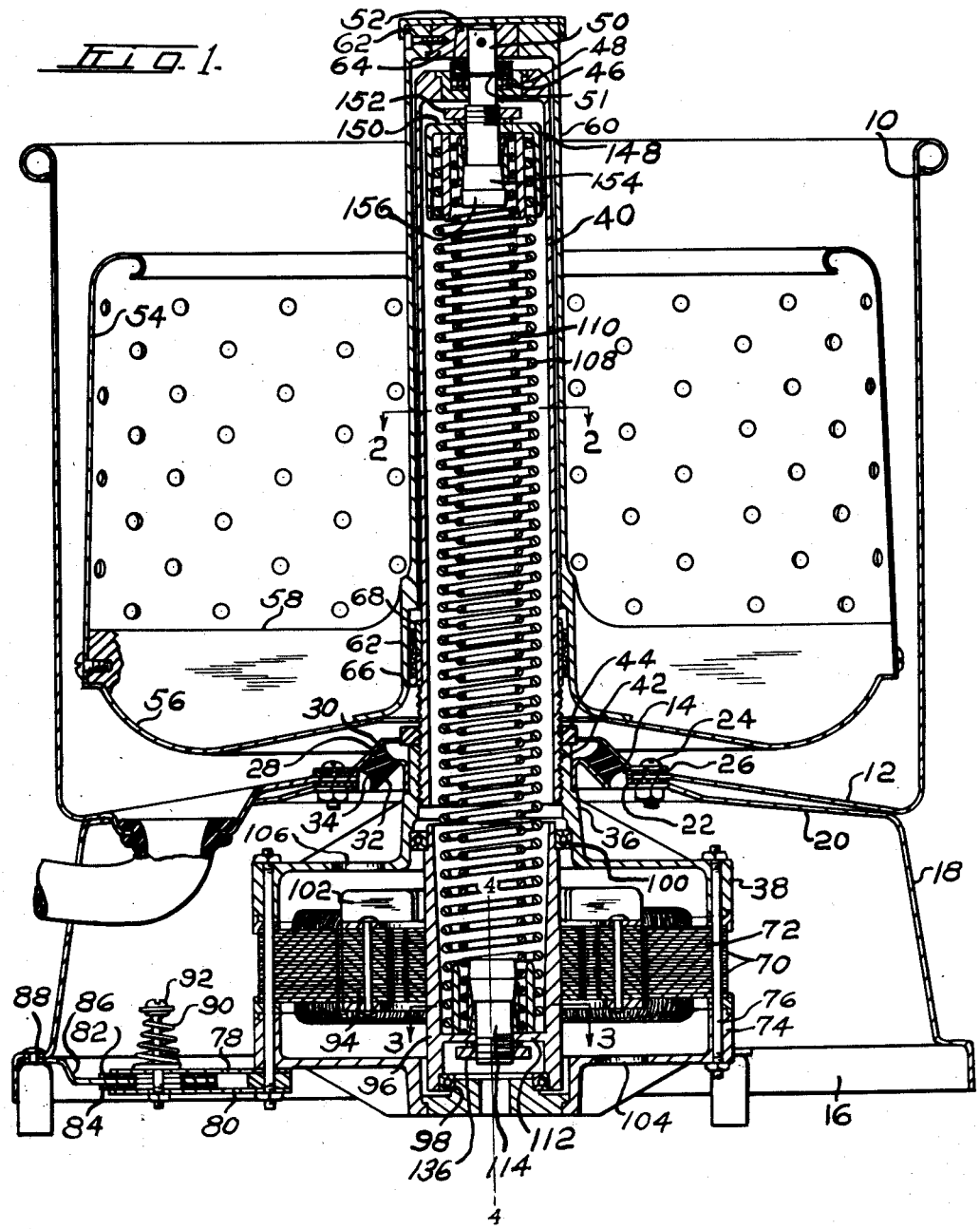
Figure 1 is a longitudinal vertical section taken through a washing machine.

In Figure 1, there is shown a tub 10 having a bottom 12 with a central aperture 14 mounted upon a hollow base 16 having a side skirt 18 and platform 20. The platform 20 has a central aperture 22 and the tub bottom and platform are secured together by a ring of bolts 24 and suitable annular gaskets 26 to provide a resilient and leaktight coupling. Secured within the apertures 22 and 14 by the bolts 24 is a resilient collar 28 comprising a pair of annular flanged members 30 and 32 having bonded therebetween a ring of resilient material 34, such as rubber. The inner flange 32 is secured by a pressed fit or otherwise about a sleeve 36 formed as an extension of the top half 38 of a motor casing. Within the sleeve 36 is an upstanding tubular member 40 extending upwardly into the tub 10 and forming a housing for the driving mechanism hereinafter to be more fully described.

The tubular member 40 is threaded within the sleeve 36 as at 42 and a suitable jam nut 44 is provided to rigidly secure the tubular member to the sleeve 36. The upper end of the tubular member 40 supports a thrust bearing 46 mounted in a shouldered bushing 48. The thrust bearing carries the load of a stub shaft 50 coaxially positioned with respect to the tubular member 40. The shaft is provided with a split ring 51 engaging the bearing 46. The stub shaft is provided with a drive block 52 of irregular shape keyed thereto. A wash-containing basket having a perforate side wall 54, a bottom 56 and agitating webs 58 is hung from the stub shaft 50 and the drive block 52 by the hollow stem 60 surrounding the tubular member 40. The stem 60 has an intergral internal collar 62 at its upper end provided with a driven block 64 adapted to fit the drive block 52. The stem 60 is provided with an annular offset adjacent its lower end as at 62 in which there is positioned cooperating bearing sleeves 66 and 68 affixed to the tubular member 40 and stem 60, respectively.

Within the base, there is provided a motor 70 having a stator 72 secured between the top member or upper half of the motor casing 38 and a bottom casing member 74, the members being clamped by bolts 76 extending through the stator 72. Friction stabilizers comprising spaced leaf members 78 and 80 are secured to the motor casing at a plurality of points by certain of the bolts 76 and are provided with friction material 82 and 84 bearing against corresponding friction plates 86 secured to the base member within an annular base flange 88. The leaf members 78 and 80 with the friction faces 82 and 84 are caused to frictionally bear against the plate 86 by reason of a compression spring 90 and tension bolt 92. Within the motor 70 is mounted a rotor 94 upon a sleeve 96, the latter being provided with bearings 98 and 100 at its opposite ends, the bearings being mounted in the top and bottom members 38 and 74 of the motor casing. The rotor carries a plurality of radial blades 102 to act as a circulating fan and the casing members are provided with suitable vents 104 and 106.

The motor shown is of the single phase, squirrel cage induction motor type of relatively slow speed, the stator being provided with 8 or 12 poles in usual practice to provide an inherent speed of somewhat less than 900 or 600 R.P.M., respectively, a desirable speed for centrifugal extracting. Such a motor without a starting winding rotates in either direction, depending on the direction of initiating rotation.

The rotor is connected to the stub shaft 50 through a resilient linkage comprising a pair of coil springs 108 and 110 extending lengthwise of the tubular member 40. The rotor sleeve 96 is provided with a transverse bulkhead 112 having a central aperture through which extends a wedge pin 114. As shown in Figure 4, the lower end of the inside wall 116 of the rotor sleeve 96 is cylindrical and of a diameter such as to closely fit the normal outside diameter of the outer spring 108. There is provided immediately within the spring 108 a sleeve 118 having the outer surface 120 of a diameter substantially equal to the internal diameter of the spring 108, the sleeve being split as at 119 to permit expansion. The internal face 122 of the sleeve 118 is of a diameter substantially that of the outside diameter of the spring 110. There is also provided a split sleeve 124 having an external surface 126 of a diameter substantially that of the inside diameter of the spring 110. The sleeve 124 is provided with opposed tapered surfaces 128 and 130 adapted to engage a taper sleeve 132 and a tapered head portion 134 on the wedge pin 114, respectively. The wedge pin is provided at its lower end with a threaded nut 136. It will be seen from the structure thus described that upon drawing the wedge pin 114 axially downward by action of the nut 136, the sleeve 124 will be expanded into tight engagement with the spring 110 and in turn the spring 110 will be forced into tight engagement with the sleeve 118. Likewise, the spring 108 will be tightly clamped between the expanded sleeve 118 and the inside wall 116 of the rotor sleeve 96, all clamping action being the result of the drawing of the wedge pin downwardly through the aperture in the bulkhead 112 through tightening of the nut 136. By the arrangement described, each of the springs 108 and 110 are rigidly secured without appreciable stress to the rotor sleeve 96. The rings 118 and 124 may be solid and not split, but a shrink fit provided by allowing the shell 96 and sleeve 118 to shrink in cooling from a temperature applied to temporarily expand the shell and sleeve. The same effect could be had by shrinking sleeves 118 and 124 in Dry Ice, for example, and allowing them to expand in tight engagement with the spring turns, forcing such turns into tight engagement with the shell. In such an arrangement, the wedge pin 114, and sleeve 132 would be eliminated, and the stub shaft 50, for example, at the upper end, would serve merely as a drive shaft and not have the additional ring expanding tapered surface 154.

In order to limit the peak stress and prevent breakage of the springs adjacent the ends which are rigidly clamped in the manner described, the internal surface of the sleeve 96 is provided with a slight taper 138 commencing at a point located at about 140, and the sleeve 118 is provided with an opposite taper 142 commencing at a point approximately radially opposite the point 140. The tapers 138 and 142 commence at a point well above the first one or two turns of the spring 108 so that the spring is rigidly secured as described, at its end by the end turns. However, the tapers 138 and 142 permit such spring to flex slightly adjacent the point of rigid attachment, such flexure increasing as the distance from the secured portion increases. The taper is such as to limit the flexure of the spring coils by an amount insufficient to permit the spring coils immediately adjacent the secured ends to be stressed beyond the elastic limit of the spring. In a like manner, it will appear that the internal surface of the sleeve 118 and the head end of the pin 114 are provided with opposite tapered surfaces 144 and 146, respectively, which control the permissible stress in the initial free turns of the spring 110 adjacent to the end turns clamped between the sleeve 124 and the cylindrical surface 122 of the sleeve 118.

The upper end of the springs 108 and 110 are anchored in a similar fashion, there being provided a cup 148 having an apertured bulkhead 150 through which the stub shaft 50 extends. The lower end of the stub shaft 50 is substantially identical to the wedge pin 114 and is adapted to be drawn through the bulkhead aperture by a threaded nut 152. The internal surface of the cup 148 is substantially the same as the internal surface of the sleeve 96, there being provided the initial cylindrical surface for gripping the first turn or two of the spring 108 and a diverging taper surface adapted to control and limit the flexure of the initial free turns of the spring 108 to limits within the elastic limit of the spring. The springs 108 and 110 are secured within the cup 148 by split rings 118 and 124 and a wedge ring 132, and a tapered surface 154 on the stub shaft 50 in identical manner to that described in connection with Figure 4. The stub shaft 50 is likewise provided with a tapered head surface 156 corresponding to the taper 146 of the wedge pin 114, which tapered surface coacts with the tapered surface 144 of the sleeve 118 to limit and control the flexure of the initial free spring turns of the spring 110.

The spring and couplings are such as to permit the spring to be held constantly in slight tension, tending to eliminate buckling and retain the spring axis in substantial alignment along the entire length during oscillatory operation. The springs thus being under tension, do not interfere with or touch one another or the surrounding tubular housing, and clearances may be relatively small.

The induction motor is provided with a stator winding 160 and a starting winding 162 connected through a capacitor 164, and a suitable switch 166 is provided to permit of the connection of a source of alternating current 168 to either the field coil alone, or the field coil and the starting coil and condenser conjointly. It will be appreciated that for washing action, it is desirable to oscillate the basket 54 through an angle of 90° or 180° at the rate of an oscillation per second or thereabouts, and that after washing has been accomplished by the agitation resulting from such oscillatory motion, the tub 10 would be drained of wash fluid and may thereafter be filled with rinse water. Oscillatory agitation may be again employed to assist the rinsing action, and such rinse water may thereafter be drained from the tub. After one or more of such rinse cycles, centrifugal extraction will be effected by continuous rotation of the basket 54 at a speed of 580 or 860 R. P. M., the approximate normal speeds of induction motors having 12 or 8 poles, respectively. To effect such continuous rotation, the switch 166 will be moved to the upper position, whereby the starting winding 162 and field 160 will be energized, producing a strong rotating field. The motor under such circumstances operates in the normal manner of an induction motor.

The oscillatory motion of the basket is obtained through oscillatory motion of the motor armature acting through the springs 108 and 110 and the basket 54, the motor armature and the basket constituting inertia members connected at opposite ends of a resilient connecting link in the form of the springs 108 and 110. By starting the motor 94 momentarily in one direction as by connecting the field winding 160 and starting winding 162 in circuit, and immediately thereafter disconnecting the starting winding 162 by moving the switch 166 to the lower position, the motor armature will be caused to stall after rotation through a given arc, and the spring having stored energy in stalling of the armature, will immediately kick the armature in the reverse direction, causing the motor to commence reverse rotation.

Thereafter, the armature will rotate until the spring becomes stressed in the opposite direction sufficient to stall armature rotation, at which point the armature will be given a starting kick in the original direction. The characteristics of a single phase induction motor are ordinarily such as to require an initial starting kick, whereupon the motor will rotate and accelerate to speed in that direction. So long as the starting winding is disconnected, it will make no difference in which direction the motor is started. Where, however, the rotor is resiliently connected to a load, as described herein, and friction is low, the rotor will tend to start oscillation the instant the power is turned on, and such oscillation will gradually grow in amplitude until full oscillatory power output is reached. A starting kick, as by momentary closure of a starting winding, may be utilized, as hereinabove described, or a manual movement of the basket will suffice, if it be not desirable to rely upon the starting tendency described. The motor armature in oscillating between the limits described will cause the basket to oscillate, since it is free to rotate in either direction; and as in spring systems of the type described, wherein inertia weights are coupled with an intervening resilient means, the basket will rotate in an opposite direction to that of the motor rotor, and both the rotor and basket will stall and reverse their rotation at approximately the same instant, and the oscillations will continue at an amplitude established by the various constant of the spring, inertia of the basket, motor armature, power input, friction, inherent speed of the motor, and damping effect of laundry contained within the basket and wash water contained within the tub. The spring during oscillation exhibits a nodal point which remains substantially stationary, and such nodal point will appear at a point intermediate the ends of the spring, the specific location being dependent to a large degree upon the respective effective inertia values of the motor, rotor and tub with its contained load or load element. By varying the characteristics of the spring, the inertia of the armature and the inertia of the basket, and the inherent speed of the armature as by choosing various pole combinations, varying degrees of oscillating angular motion may be obtained, and the frequency may be likewise varied. Consequently, any washing agitation motion that may be desired may be provided for by selecting the proper inertia weight of the motor armature, basket and springs. In the form illustrated, two springs are utilized in order to obtain greater resiliency with sufficient strength in a given space. In practice, it may be desirable to increase the number of springs, arranging them concentric and utilizing approximately the same type of concentric coupling disclosed, or a single spring may be employed. In any case, however, where coil springs are utilized, it is desirable to provide a restriction upon the initial free turns of the spring at either end to prevent the spring from being wrapped too tightly or unwrapped to a degree which would imperil the fibre strength of the spring carrying the spring beyond the elastic limit, resulting in possible fatigue or fracture. In practice, the induction motor may, during a part of its cycle, act as an induction generator after having been brought to or attained inherent speed prior to the complete expenditure of energy of the spring before reversal of the spring tension.

The invention has been described in conjunction with an oscillatable or rotatable basket, but it will appear that the resilient coupling might equally well drive a washing machine agitator, or in fact any load member which it is desired to oscillate. In practice, the angle of rotation of the motor rotor with reference to the driven element, the basket, in the form shown is in inverse proportion to their respective inertias, and in the case of a basket filled with laundry and partially submerged in wash water, the inertia of such basket is to some extent increased by the water swirl and contained laundry. It will thus be seen that the rotor, being of less inertia than the basket, may make several revolutions to the partial revolution of the basket; and that such rotor may thus have an inherent speed particularly suitable to rotation of the basket for centrifugal extraction, when it is desired to cause the rotor to drive the basket continuously in one direction for extraction purposes. Thus, the basket, when oscillating, has a reduced angular velocity, and when rotating, has the inherent speed of the rotor, or a velocity suitable for centrifugal extraction.

The resilient mounting of the motor and column, with friction damping means, assists in permitting the basket and any somewhat unbalanced load to rotate about its true center of mass during such extraction.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In a machine of the character described, a motor having a frame including a stator, and a rotor journaled therein, an oscillatable work element, means for journaling said element for oscillation about an axis coaxial with said rotor, resilient means in the form of a coil spring and having its opposite ends connected in driving relation to said rotor and element respectively, and means for rigidly securing the opposite ends of said spring to said rotor and element, and means for limiting the deflection of the initial free turns of said spring adjacent said rigid securing means.

2. In a machine of the character described, an electric reversible motor having a frame including a stator, and a rotor journaled therein, said rotor being adapted to rotate in either direction according to starting direction, an oscillatable work element, means for journaling said element for oscillation about an axis coaxial with said rotor, resilient means in the form of a coil spring and having its opposite ends connected in driving relation to said rotor and element respectively, and means for rigidly securing the opposite ends of said spring to said rotor and element, and means for limiting the deflection of the initial free turns of said spring adjacent said rigid securing means.

3. In a machine of the character described, a single phase induction motor having a frame including a stator, and a rotor journaled therein, said frame having a central column coaxial with respect to said rotor, an oscillatable work element journaled on said column, resilient means in the form of a coil spring extending through said column and having its opposite ends connected in driving relation to said rotor and element respectively, and connections for said ends including internal and external cylindrical gripping surfaces in engagement with the initial turns of said coil spring, said surfaces being relieved in the form of tapered flares adjacent the gripped turns to control the deflection of the free turns immediately adjacent said gripped turns.

4. In a machine of the character described, an electric reversible motor having a frame including a stator, and a rotor journaled therein, said rotor being adapted to rotate in either direction according to starting direction, said frame having a central column coaxial with respect to said rotor, an oscillatable work element journaled on said column, resilient coil spring means extending through said column and having its opposite ends connected in driving relation to said rotor and element respectively, and connections for said ends including internal and external cylindrical gripping surfaces in engagement with the initial turns of said coil spring, said surfaces being relieved in the form of tapered flares adjacent the gripped turns to control the deflection of the free turns immediately adjacent said gripped turns.

5. In a machine of the character described, a single phase induction motor having a frame including a stator, and a rotor journaled therein, said frame having a support, an oscillatable work element journaled on said support, resilient means in the form of a coil spring having its opposite ends connected in driving relation to said rotor and element respectively, and connections for said ends including internal and external cylindrical gripping surfaces in engagement with the initial turns of said coil spring, said surfaces being relieved in the form of tapered flares adjacent the gripped turns to control the deflection of the free turns immediately adjacent said gripped turns.

6. In a washing machine, a single phase induction motor having a frame including a stator, and a vertical axis rotor journaled therein, said frame having an upstanding central column coaxial with respect to said rotor, a tub having a bottom with a central aperture therein arranged about said column and secured thereto, an oscillatable washing element within said tub and journaled on said column, resilient means in the form of a coil spring extending through said column and having its opposite ends connected in driving relation to said rotor and element respectively, and connections for said ends including internal and external cylindrical gripping surfaces in engagement with the initial end turns of said coil spring, and confining flares adjacent said gripping surfaces encompassing the free turns adjacent said initial turns to control the deflection of said free turns.

7. In a washing machine, a single phase induction motor having a frame including a stator, and a vertical axis rotor journaled therein, said frame having an upstanding central column coaxial with respect to said rotor, a tub having a bottom with a central aperture therein arranged about said column and secured thereto, an oscillatable washing element within said tub and journaled on said column, resilient means in the form of a coil spring extending through said column and having its opposite ends connected in driving relation to said rotor and element respectively, and clamping means for rigidly gripping the initial turns of said coil spring internally and externally thereof, said clamping means having outwardly and inwardly flared extensions overlying the free turns adjacent the gripped turns of said spring to control the deflection of said free turns.

8. In a washing machine, an electric reversible motor having a frame including a stator, and a vertical axis rotor journaled therein, said rotor being adapted to rotate in either direction according to starting direction, a tub, means for mounting said tub in fixed relation to said frame, an oscillatable washing element within said tub and journaled with respect to said frame, resilient means in the form of a coil spring having its opposite ends connected in driving relation to said rotor and element respectively, and clamping means for rigidly gripping the initial turns of said coil spring internally and externally thereof, said clamping means having outwardly and inwardly flared extensions overlying the free turns adjacent the gripped turns of said spring to control the deflection of said free turns.

9. In a washing machine, an electric reversible motor having a frame including a stator and a vertical axis rotor journaled therein, said rotor being adapted to rotate in either direction according to starting direction, said frame having an upstanding central column coaxial with respect to said rotor, a tub having a bottom with a central aperture therein arranged about said column and secured thereto, a wash containing basket within said tub and journaled on said column, resilient means in the form of a coil spring extending through said column and having its opposite ends connected in driving relation to said rotor and basket respectively, and clamping means for rigidly gripping the initial turns of said coil spring internally and externally thereof, said clamping means having outwardly and inwardly flared extensions overlying the free turns adjacent the gripped turns of said spring to control the deflection of said free turns.

10. In a washing machine, a single phase induction motor having a frame including a multiple pole stator having running and starting windings thereon, and a vertical axis rotor journaled therein, said frame having an upstanding central column coaxial with respect to said rotor, a tub having a bottom with a central aperture therein arranged about said column and secured thereto, a wash containing basket within said tub and journaled on said column, resilient means in the form of a coil spring extending through said column and having its opposite ends connected in driving relation to said rotor and basket respectively, the opposite ends of said spring being received in opposed internal and external clamping rings having means for causing said rings to rigidly grip the initial turns of said coil spring internally and externally thereof and said rings being flared outwardly and inwardly respectively adjacent the initially gripped turns of said spring to control the deflection of the adjacent free turns, and circuit means for exciting one or both of said windings.

11. In a washing machine, a single phase induction motor having a frame including a multiple pole stator having running and starting windings thereon, and a vertical axis rotor journaled therein, said frame having an upstanding central column coaxial with respect to said rotor, a tub having a bottom with a central aperture therein arranged about said column and secured thereto, a wash containing basket within said tub and journaled on said column, resilient means in the form of a coil spring extending through said column and having its opposite ends connected in driving relation to said rotor and basket respectively, clamping means for rigidly gripping the initial turns of said coil spring internally and externally thereof, said clamping means having outwardly and inwardly flared extensions overlying the free turns adjacent the gripped turns of said spring to control the deflection of said free turns, and circuit means for exciting one or both of said windings.

12. In a washing machine, a single phase induction motor having a frame including a multiple pole stator, and a vertical axis rotor journaled therein, said frame having an upstanding central column coaxial with respect to said rotor, a tub having a bottom with a central aperture therein arranged about said column, and an annular ring of resilient water tight material interconnecting said tub bottom and column, a base supporting said tub, an oscillating agitator within said tub and journaled on said column, resilient means in the form of a coil spring extending through said column and having its opposite ends connected in driving relation to said rotor and agitator respectively, the opposite ends of said spring being received in opposed cylindrical wall cups having an end wall and having an internal cylindrical gripping member and tapered means slidably mounted in the end wall of said cup for expanding said member, said cylindrical wall of said cup and said cylindrical gripping member being of a length to grip the initial turns of said coil spring internally and externally thereof and being flared slightly outwardly and inwardly respectively adjacent the initially gripped turns of said spring to control the deflection of said free turns.

13. In a washing machine, a single phase induction motor having a frame including a multiple pole stator, and a vertical axis rotor journaled therein, said frame having an upstanding central column coaxial with respect to said rotor, a tub having a bottom with a central aperture therein arranged about said column, and an annular ring of resilient water tight material interconnecting said tub bottom and column, a base supporting said tub, and friction damping means interconnecting said frame with said base, a wash containing basket within said tub and journaled on said column said basket having vanes for agitation, resilient means in the form of a coil spring extending through said column and having its opposite ends connected in driving relation to said rotor and basket respectively, the opposite ends of said spring being received in opposed cylindrical wall cups having an end wall and having an internal cylindrical gripping member and tapered means slidably mounted in the end wall of said cup for expanding said member, said cylindrical wall of said cup and said cylindrical gripping member being of a length to grip the initial turns of said coil spring internally and externally thereof and being flared slightly outwardly and inwardly respectively adjacent the initially gripped turns of said spring to control the deflection of said free turns.

14. In a washing machine, a single phase induction motor having a frame including a multiple pole stator having running and starting windings thereon, and a vertical axis rotor journaled therein, said frame having an upstanding central column coaxial with respect to said rotor, a tub having a bottom with a central aperture therein arranged about said column, and an annular ring of resilient water-tight material interconnecting said tub bottom and column, a base supporting said tub, and friction damping means interconnecting said frame with said base, a wash containing basket within said tub and journaled on said column, said basket having vanes for agitation and discharge means for centrifugal extraction, resilient means in the form of a coil spring extending through said column and having its opposite ends connected in driving relation to said rotor and basket respectively, the opposite ends of said spring being received in opposed cylindrical wall cups having an end wall and having an internal cylindrical gripping member and tapered means slidably mounted in the end wall of said cup for expanding said member, said cylindrical wall of said cup and said cylindrical gripping member being of a length to grip the initial turns of said coil spring internally and externally thereof and being flared slightly outwardly and inwardly respectively adjacent the initially gripped turns of said spring to control the deflection of said free turns, and circuit means for exciting said running winding alone to produce oscillating motion of said basket, or both windings simultaneously for starting or rotation of said basket for centrifugal extraction.

15. In a machine of the character described, a single phase induction motor having a frame including a stator, and a rotor journaled therein, said frame having a central column coaxial with respect to said rotor, an oscillatable work element journaled on said column, resilient means in the form of a pair of coaxially arranged coil springs extending through said column and having their opposite ends connected in driving relation to said rotor and element respectively, and connections for said ends including internal and external cylindrical gripping surfaces in engagement with the initial turns of said coil springs, said surfaces being relieved in the form of tapered flares adjacent the gripped turns to control the deflection of the free turns immediately adjacent said gripped turns.

16. In a torsion spring coupling, a torsion coil spring having substantially uniform diameter end turns, annular members internally and externally arranged about said end turns in rigid gripping relation, said annular members being flared inwardly and outwardly respectively adjacent the free turns adjacent the gripped end turns, to controllably limit the deflection of the free turns immediately adjacent said gripped turns.

BRYAN W. CHAPIN.

References Cited in the file of this patent

UNITED STATES PATENTS

| Number | Name | Date |
| --- | --- | --- |
| 1,013,925 | Bliss | Jan. 9, 1912 |
| 1,194,336 | Keim | Aug. 8, 1916 |
| 1,621,428 | Pedersen et al. | Mar. 15, 1927 |
| 1,801,958 | Haydon | Apr. 21, 1931 |
| 2,105,514 | Welch | Jan. 18, 1938 |
| 2,161,604 | Watts | June 6, 1939 |
| 2,533,722 | De Remer | Dec. 12, 1950 |